US012537130B2

(12) United States Patent
Yuan

(10) Patent No.: US 12,537,130 B2
(45) Date of Patent: Jan. 27, 2026

(54) LOW VOLTAGE HIGH CURRENT POWER SUPPLY DEVICE

(71) Applicant: HEFEI SANYU ELECTRIC CO., LTD., Anhui (CN)

(72) Inventor: Zhongjie Yuan, Anhui (CN)

(73) Assignee: HEFEI SANYU ELECTRIC CO., LTD., Anhui (CN)

( * ) Notice: Subject to any disclaimer, the term of this patent is extended or adjusted under 35 U.S.C. 154(b) by 179 days.

(21) Appl. No.: 18/260,655

(22) PCT Filed: Dec. 17, 2021

(86) PCT No.: PCT/CN2021/139155
§ 371 (c)(1),
(2) Date: Jul. 7, 2023

(87) PCT Pub. No.: WO2022/148229
PCT Pub. Date: Jul. 14, 2022

(65) Prior Publication Data
US 2024/0062951 A1 Feb. 22, 2024

(30) Foreign Application Priority Data

Jan. 8, 2021 (CN) .......................... 202110021295.0

(51) Int. Cl.
*H01F 27/32* (2006.01)
*H01F 27/02* (2006.01)
(Continued)

(52) U.S. Cl.
CPC ............. *H01F 27/32* (2013.01); *H01F 27/02* (2013.01); *H01F 27/10* (2013.01); *H01F 27/24* (2013.01); *H02M 7/003* (2013.01)

(58) Field of Classification Search
CPC .......... H01F 27/32; H01F 27/02; H01F 27/10; H01F 27/24; H02M 7/003
(Continued)

(56) References Cited

U.S. PATENT DOCUMENTS 1,343,205 A * 6/1920 Eschholz ............. B23K 9/1031
315/308
2,719,946 A * 10/1955 Riley ...................... H01F 27/40
336/55
(Continued)

FOREIGN PATENT DOCUMENTS

CN 202258740 U 5/2012
CN 205680520 U 11/2016
(Continued)

*Primary Examiner* — Anatoly Vortman
(74) *Attorney, Agent, or Firm* — Hawaii Patent Services; Nathaniel K. Fedde; Kenton N. Fedde

(57) ABSTRACT

A low voltage high current power supply device includes at least one transformer body, a primary coil and at least one secondary coil. Central leading out terminals and secondary leading out terminals of strip shapes are provided at different positions of the at least one secondary coil, central leading out terminals and the secondary leading out terminals are provided symmetrically at both sides of the magnetic core. A heat dissipation unit includes a first heat dissipation panel and a second heat dissipation panel. The first heat dissipation panel is provided at a top portion of the at least one transformer body. The second heat dissipation panel is provided at a bottom portion of the at least one transformer body. The central leading out terminals and secondary leading out terminals are connected symmetrically at both sides of the first heat dissipation panel and the second heat dissipation panel.

10 Claims, 7 Drawing Sheets

(51) Int. Cl.
  *H01F 27/10*  (2006.01)
  *H01F 27/24*  (2006.01)
  *H01F 27/34*  (2006.01)
  *H02M 7/00*  (2006.01)

(58) Field of Classification Search
  USPC ........................................................ 361/704
  See application file for complete search history.

(56) References Cited

U.S. PATENT DOCUMENTS

| | | | | |
|---|---|---|---|---|
| 2,800,571 | A * | 7/1957 | Glenn | B23K 9/0735 |
| | | | | 315/141 |
| 4,694,140 | A * | 9/1987 | Wheeler | H01F 27/10 |
| | | | | 336/60 |
| 5,160,820 | A * | 11/1992 | Tsujii | H01F 38/085 |
| | | | | 29/605 |
| 10,717,148 | B2 * | 7/2020 | Nicewonger | H05K 7/20272 |
| 2002/0134763 | A1 | 9/2002 | Marek et al. | |
| 2006/0289395 | A1 * | 12/2006 | Nomizu | G01R 31/58 |
| | | | | 219/109 |
| 2013/0008877 | A1 * | 1/2013 | Han | H01F 38/085 |
| | | | | 219/116 |
| 2016/0129520 | A1 * | 5/2016 | Schwartz | H05K 7/20136 |
| | | | | 219/130.1 |
| 2024/0387097 | A1 * | 11/2024 | Chinzaka | H01F 27/324 |

FOREIGN PATENT DOCUMENTS

| | | |
|---|---|---|
| CN | 107276428 A | 10/2017 |
| CN | 110911130 A | 3/2020 |
| CN | 112756758 A | 5/2021 |
| CN | 112820515 A | 5/2021 |
| CN | 215356681 U | 12/2021 |

* cited by examiner

LOW VOLTAGE HIGH CURRENT POWER SUPPLY DEVICE

TECHNICAL FIELD

The present invention relates to the technical field of high frequency welding power supply devices, specifically to a low voltage high current power supply device.

BACKGROUND TECHNOLOGY

Power supply devices comprise inverters, transformers, rectifiers and controllers, wherein transformers are devices to convert AC voltage, current and impedance, when an AC current is energized in a primary coil, AC magnetic flux is generated in the iron core or the magnetic core, and voltage or current will be induced in a secondary coil. The transformer comprises the iron core or the magnetic core and coils, the coils comprise two or more windings, wherein the winding with access to the power supply is called the primary coil and the other windings are called secondary coils.

Low voltage high current high frequency transformers are widely used in industries, in the technical field of electric resistance welding, very strict requirements are placed on high current output and heat dissipation conditions of the transformers in the power supply modules. Conventionally water-cooled winding methods are used for medium frequency resistance welding transformers, very likely the transformers will have big leakage inductance, and the transformers are detachably connected with the invertors, consequently, the leakage inductance is increased, thus it is necessary to employ bigger inverters and rectifiers to increase redundancy and the transformers can only work at a frequency of 800-1200 Hz. When working at high frequency, with the gradual increase of the duty ratio loss along with the increase of the frequency, the loss becomes larger, so that low voltage high current power output efficiency is greatly reduced, welding requirements cannot be met and thus significant influence is left on the welding quality. To output higher current, reduce leakage inductance, the inverters are generally installed at the $3^{rd}$ axis or the $4^{th}$ axis of a movable arm, close to the medium frequency resistance welding transformer, as a result, loading weight of the robot is increased and wiring difficulty increased, which makes it not easy to design the reliability.

In the meanwhile, due to big leakage inductance, medium frequency resistance welding transformers have deficiencies such as complicated structural design, big volumes thereof and heavy weights, as a direct consequence, the electrical resistance welding device occupies large space, and it is not easy to operate them and working safety of the robotic devices is influenced too. In the prior art, coupling between windings of the secondary coils is poor, power loss density of the magnetic cores and the leakage inductance is increased, consequently, temperature rise of the output high current is too big, a lot of heat is generated, and the heat if not disseminated in time, will affect usage life of the transformers and even cause accidents.

SUMMARY OF THE INVENTION

To address the foregoing technical problems, the present invention provides a low voltage high current power supply device, comprising:

a transformer body, wherein the transformer body comprises a magnetic core, a primary coil and at least one secondary coil, the primary coil and the at least one secondary coil are wound around the magnetic core tightly, and a thermal conductive insulation paste is filled in between the primary coil and the at least one secondary coil to form a transformer line pack;

a plurality of central leading out terminals and a plurality of secondary leading out terminals are disposed at different positions of the at least one secondary coil, wherein the plurality of central leading out terminals are symmetrically provided at both sides of the magnetic core and the plurality of secondary leading out terminals are symmetrically provided at both sides of the magnetic core;

a heat dissipation unit, comprises a first heat dissipation panel and a second heat dissipation panel, wherein the first heat dissipation panel is horizontally provided at a top portion of the transformer body, the second heat dissipation panel is vertically provided at a bottom portion of the transformer body, the plurality of central leading out terminals are symmetrically provided at both sides of the first heat dissipation panel and the plurality of secondary introduction panels are symmetrically connected at both sides of the second heat dissipation panel;

an inverter assembly, wherein the inverter assembly is provided on the first heat dissipation panel, is located at a side opposite to the transformer body and is connected with the primary coil via at least one primary pin;

a rectifier assembly, wherein the rectifier assembly is provided symmetrically at both sides of the second heat dissipation panel and is located in between the plurality of the secondary leading out terminals and the second heat dissipation panel.

Preferably, the at least one primary pin, the plurality of central leading out terminals and the plurality of secondary leading out terminals are configured to be of a copper strip structure.

Preferably, an insulation layer is provided in between the first heat dissipation panel, the second heat dissipation panel and the magnetic core of the transformer body. Preferably, the at least one secondary coil and the primary coil are configured to be stripe-shaped copper conductors, and a thickness of the copper conductors falls into a range of 0.05 mm to 1 mm.

By winding tightly the copper strips in different layers between the primary coil and the at least one secondary coil, and pouring the heat dissipation electric insulation paste, the coil pack of the transformer becomes a solid thermal conduction body, by winding of the primary coil and the at least one secondary coil and pouring the paste, the integration of the device is good, the problem that leakage inductance of the transformer is big and heat inside the coil pack of the transformer cannot be transferred to the surface is overcome, consequently, the leakage inductance of the transformer is small, heat dissipation is good and the structure is tight and close.

Preferably, the plurality of secondary leading out terminals are arranged sequentially on a plane after being bent for a plurality of times.

Preferably, a plurality of cooling water passages are provided inside the first heat dissipation panel and the second heat dissipation panel.

Preferably, a circle of cooling water ducts is wound outside the primary coil and the at least one secondary coil.

Preferably, the cooling water ducts comprises one or more cooling water pipes, wherein ends of the one or more cooling water pipes are connected via at least one water pipe joint.

By respectively connecting the plurality of central leading out terminals and the plurality of secondary leading out terminals with the first heat dissipation panel and the second heat dissipation panel and winding cooling structures of cooling pipes around the line pack of the transformer, the heat generated by the transformer is transmitted out, heat dissipation of the transformer is addressed so that the transformer can work reliably and continuously for a long term.

Preferably, the power supply device further comprises a casing, and either ends of the first heat dissipation panel and the second heat dissipation panel extend out of the casing.

Preferably, a plurality of connection holes for connection with a welding tong are provided on portions of the first heat dissipation panel and the second heat dissipation panel extending out of the casing.

For the low voltage high current power supply device as provided in the present invention, by providing the plurality of connection holes for connecting with the electric resistance welding tong, interchange of X-shaped welding tongs and C-shaped welding tongs can be done freely, which makes it extremely convenient for production and maintenance and saves expenses and resources.

The low voltage high current power supply device provided in the present invention, by providing a plurality of secondary coils and with the special heat dissipation mode, the transformer can work for a long term at a current of tens of thousands of amperes, as the leakage inductance of the transformer is extremely small, switch stress is reduced to a great extent, smaller volume inverters and rectifiers can be selected for the power supply device, requirements on cooling are reduced, the power inverter assembly is integrated in the transformer, which makes it possible to design a tight integral power supply unit. As the leakage inductance of the transformer is small, duty-ratio-loss is small, a ratio of active power is big, and the low voltage high current power supply device maintains a very high efficiency output at a working frequency of 10 KHz to 20 KHz, which starts a new era for high frequency power supply of electrical resistance welding.

BRIEF DESCRIPTION OF DRAWINGS

To explain the technical solutions of the present invention more clearly, hereinafter a simple introduction will be given to the drawings to be used in description of the embodiments, apparently, the drawings described here are only some of the embodiments of the present invention, and for those of ordinary skill in the art, without paying creative effort, it is still possible to obtain other drawings based on the drawings provided here.

Marks in the drawings are.

Figure 1:
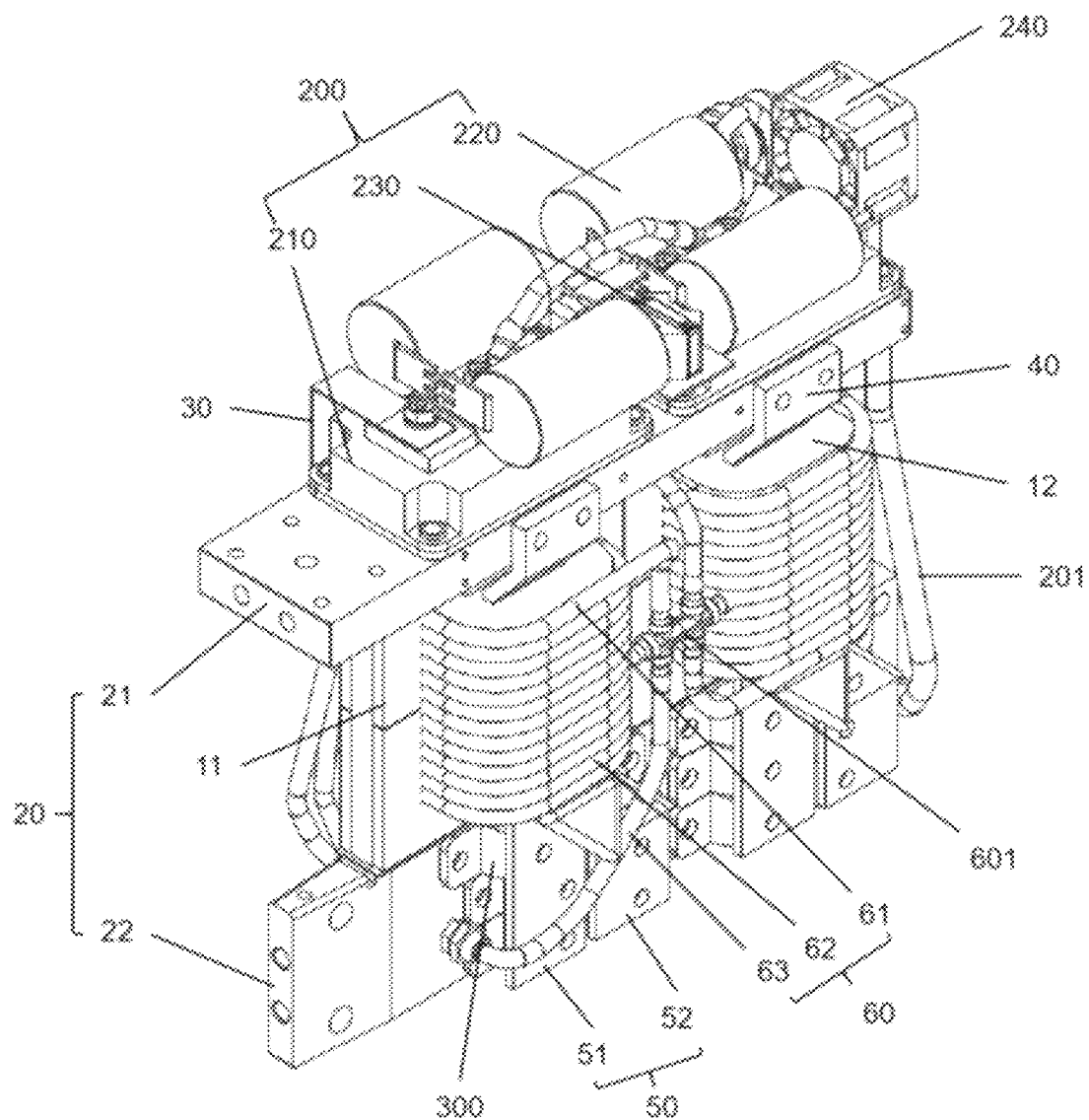
FIG. 1 is a structural diagram showing a low voltage high current power supply device proposed in the present invention.

100 transformer; 10 transformer body; 101 top portion of the transformer body; 102 bottom portion of the transformer body; 11 magnetic core; 12 transformer line pack; 30 primary pin; 40 central leading out terminal; 50 secondary leading out terminal; 51 first secondary leading out terminal; 52 second secondary leading out terminal; 20 heat dissipation unit; 21 first heat dissipation panel; 22 second heat dissipation panel; 200 inverter assembly; 210 IGBT tube; 220 capacitor; 230 pulse inverter; 240 fan; 300 rectifier assembly; 201 communication tube; 60 cooling water duct; 61 first cooling water duct; 62 second cooling water duct; 63 intermediate cooling water duct; 601 water pipe joint; 111 casing; 102 air outlet; 112 second electrode; 120 movable arm structure; 121 movable arm; 211 transverse rod portion; 212 rotation plate; 122 nut flange; 1201 first conductive bridge; 130 connection block; 140 drive assembly; 141 drive rod; 142 flange structure; 510 lateral connection plate; 150 static arm; and 501 second conductive bridge.

EMBODIMENTS

Hereinafter with specific instances the embodiments of the present invention are described, and those skilled in the art can readily appreciate other advantages and effects of the present invention with the content disclosed in the present description. Furthermore, the present invention can be implemented or applied in other different manners, the details in the present invention can be modified or changed based on different points and applications without departing from the spirit of the present invention.

It shall be noted that, the drawings provided in the present invention are used to explain the basic idea of the present invention by providing examples, therefore, in the drawings only components related to the present invention are shown and the drawings are not drafted based on the number, shape and dimension of components during implementation of the present invention, random changes can be done to the shapes, numbers and ratios of the components during actual implementation, and actually the layout and configuration of the components can be more complicated. The present invention provides a power supply device, wherein the power supply device comprises a transformer 100, an inverter assembly 200 and a rectifier assembly 300.

Figure 2:
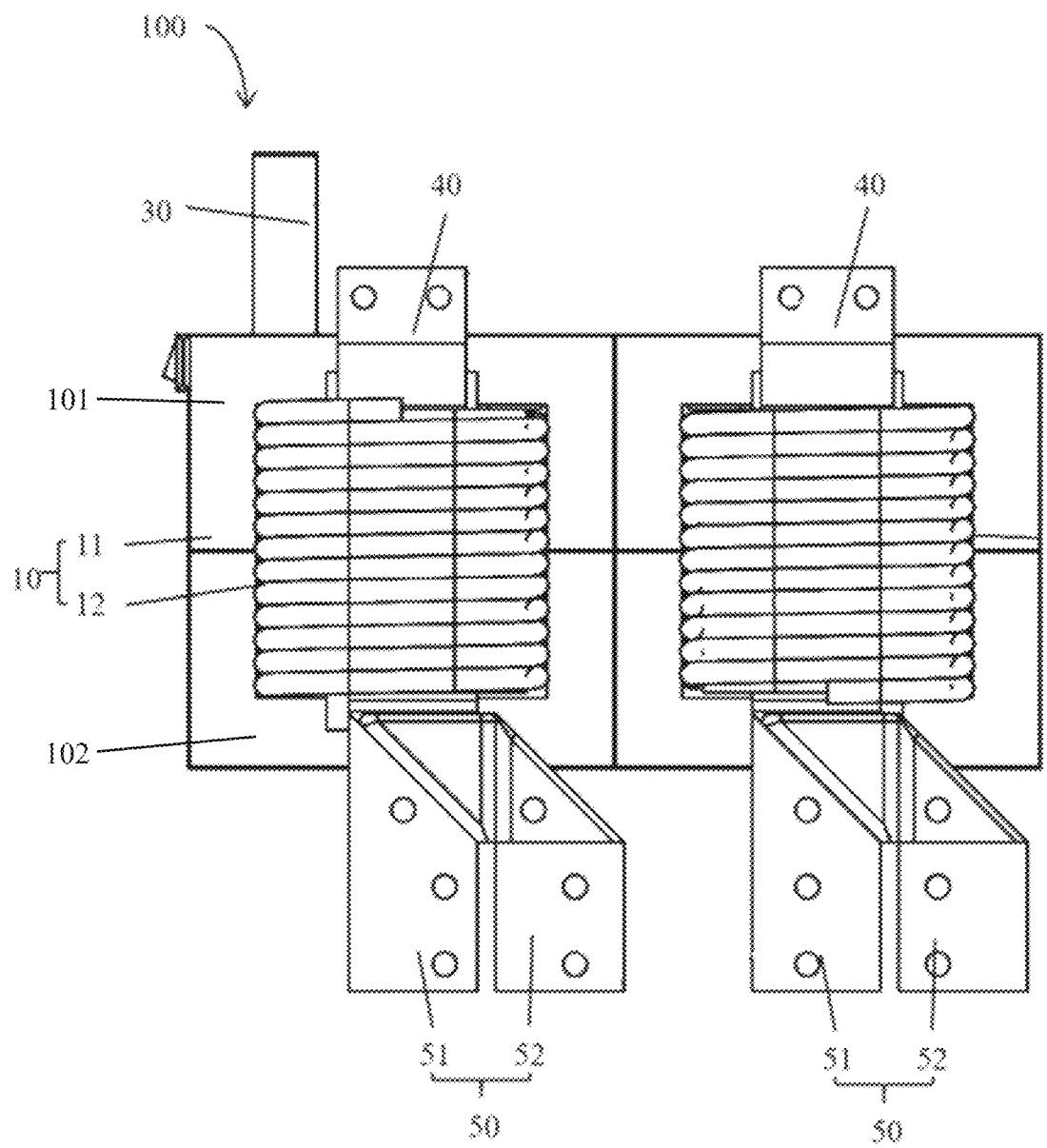
FIG. 2 is a structural diagram showing a transformer of the low voltage high current power supply device proposed in the present invention.

As shown in FIGS. 1-2, in the present embodiment, the transformer 100 comprises a transformer body 10, wherein the transformer body 10 comprises a magnetic core 11, a primary coil and at least one secondary coil, wherein the primary coil and the at least one secondary coil are wound around the magnetic core 11, and are located at an intermediate portion of the magnetic core 11, in the present embodiment, the primary coil and the at least one secondary coil are provided to be copper strip structures, and are wound around the magnetic core 11 in different layers, insulation thermal conduction paste is poured in between, a transformer line pack 12 is formed, thermal conduction in between coils is enhanced, heat inside the transformer line pack is transmitted to a surface thereof, in this way, heat dissipation effects are improved. In the present embodiment, the magnetic core 11 comprises but is not limited to EE-type magnetic cores.

As shown in FIG. 2, in the present embodiment, a plurality of central leading out terminals 40 and secondary leading out terminals 50 of a ribbon shape are provided at different positions of the at least one secondary coil, the plurality of central leading out terminals 40 are symmetrically provided at both sides of the magnetic core 11, the plurality of secondary leading out terminals 50 are symmetrically provided at both sides of the magnetic core, in this way, leakage inductance of the transformer is reduced, output power of the transformer is increased, and the transformer body transmits heat out via the plurality of central leading out terminals and the plurality of secondary leading out terminal so to improve heat dissipation effects. In the present embodiment, the primary coil and the at least one secondary coil are provided to be for example ribbon-shaped copper conductors, with a thickness of 0.05 mm to 1 mm. In the present embodiment, by winding the at least one secondary coil and winding of the primary coil and the at least one secondary coil, coupling effects are good, the problem that the leakage inductance of the transformer is big is addressed, the leakage inductance is small, especially at low voltage high current high frequency conditions, duty ratio loss is small, working frequency is greatly improved, and switch stress is reduced significantly.

Figure 3:
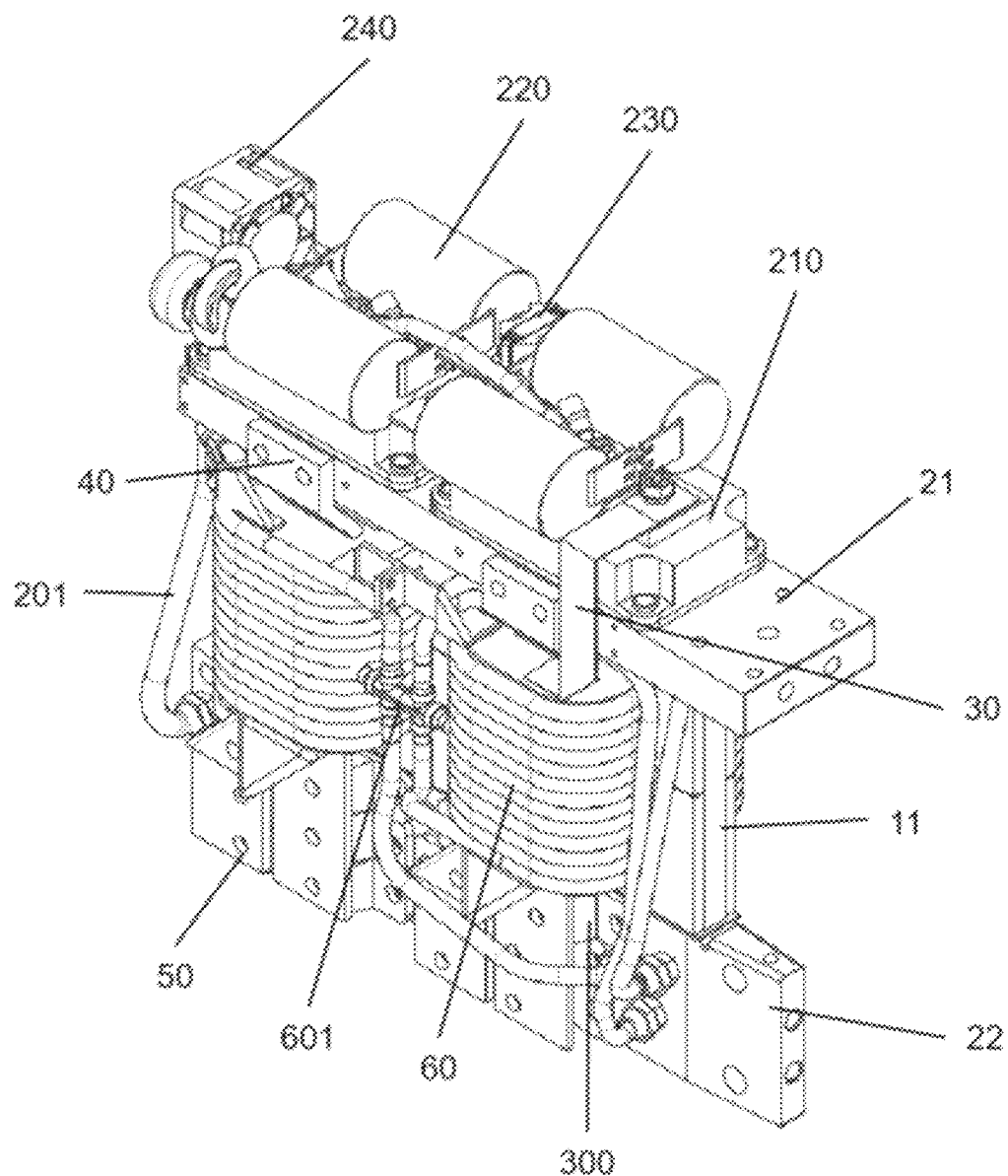
FIG. 3 is a structural diagram showing the low voltage high current power supply device in a different perspective as proposed in the present invention.

As shown in FIGS. 1 and 3, in the present embodiment, the transformer 100 comprises a heat dissipation unit 20, wherein at least one cooling water passage is provided in the heat dissipation unit 20, the at least one cooling water passage is used to communicate cooling water so as to cool the transformer 100.

As shown in FIG. 3, the heat dissipation unit 20 comprises a first heat dissipation panel 21 and a second heat dissipation panel 2, wherein the first heat dissipation panel 21 and the second heat dissipation panel 22 are provided at both sides of the transformer body 10 opposite to each other. In the present embodiment, the first heat dissipation panel 21 and the second heat dissipation panel 22 are provided to be of water-cooled plate structures, the water-cooled plates are provided directly on both sides of the magnetic core 11 opposite to each other, in addition, the at least one cooling water passage is provided in the water-cooled plates, and a plurality of water cooling passages are provided in the first heat dissipation panel 21 and the second heat dissipation panel 22. In the present invention, the plurality of central leading out terminals 40 are symmetrically connected at both sides of the first heat dissipation panel, and the plurality of secondary leading out terminals 50 are symmetrically connected at both sides of the second heat dissipation panel 22, in this way, the heat generated by the transformer 100 is cleaned and the transformer 100 is cooled down.

As shown in FIGS. 1 and 3, in the present embodiment, the welding power supply device further comprises an inverter assembly 200 and a rectifier assembly 300, the first heat dissipation panel 21 is provided horizontally on a top portion of the transformer body 10, the second heat dissipation panel 22 is vertically provided at a bottom portion of the transformer body 10, the inverter assembly 200 rests tightly against the first heat dissipation panel 21, and is located at a side that is opposite to the transformer body 10, the rectifier assembly 300 is provided symmetrically on the second heat dissipation panel 22, the rectifier assembly 300 comprises a plurality of rectifier tubes, the rectifier tubes are symmetrically provided at both sides of the second heat dissipation panel 22, and are located in between the plurality of secondary leading out terminals and the second heat dissipation panel 22, and by resting the rectifier assembly 200 closely on the first heat dissipation panel 21, the first heat dissipation panel 21 will assist in heat dissipation of the inverter assembly 200, the second heat dissipation panel 22 will assist in heat dissipation of the rectifier assembly 300, and the inverter assembly and the rectifier assembly can work efficiently in low voltage high current high frequency conditions.

As shown in FIGS. 1 and 3, in the present embodiment, by coordinated heat dissipation of the first heat dissipation panel 21, the second heat dissipation panel 22, the plurality of central leading out terminals 40 and the plurality of secondary leading out terminals 50, the inverter assembly 20 is maintained to rest closely on a side of the transformer 100, and by configuration of the first heat dissipation panel 21 and the second dissemination panel 22, and by providing symmetrically the rectifier assembly 300 on both sides of the second heat dissipation panel 22 and in between the plurality of secondary leading out terminals and the second heat dissipation panel 22, the leakage inductance is reduced to a further extent, a ratio of active power is big, switch stress is greatly reduced, appliances with smaller volumes can be used for the inverter tubes and the rectifier tubes, so requirement on cooling is reduced. By arranging tightly the inverter assembly 200, the rectifier assembly 300 and the transformer 100 with the first heat dissipation panel 21 and the second heat dissipation panel 22, the volume of the power supply device is small, heat dissipation is fast, in low voltage high current and high frequency conditions, current ranging from 15,000 to 20,000 amperes can be output, and the level of high current output power of the transformer is significantly improved. In the meanwhile, the overall structure is tight, arrangement is reasonable, space is fully used, so that the volume of the welding power supply is small, which makes it possible to design very tight integral power supply unit and makes the entire device very small.

As shown in FIGS. 1 and 3, in the present embodiment, the inverter assembly 200 comprises a plurality of IGBT tubes 210, a plurality of capacitors 220 and at least one pulse inverter 230, wherein the inverter assembly 200 is connected with the primary coil via at least one primary pin 30, the plurality of IGBT tubes 210 rest closely and are provided horizontally on the first heat dissipation panel 21, and at least two capacitors 220 are provided on each of the plurality of IGBT tubes, the at least one pulse inverter 230 is provided in between the plurality of IGBT tubes 210, and by resting the inverter assembly 200 on the first heat dissipation panel 21, the leakage inductance is reduced, output current and power is increased and heat dissipation of the inverter assembly 200 is done via the first heat dissipation panel 21. In the present embodiment, at least a fan 240 is provided at an end of the first heat dissipation panel 21, the at least a fan 240 faces the inverter assembly 200 to enhance heat dissipation effects.

Figure 4:
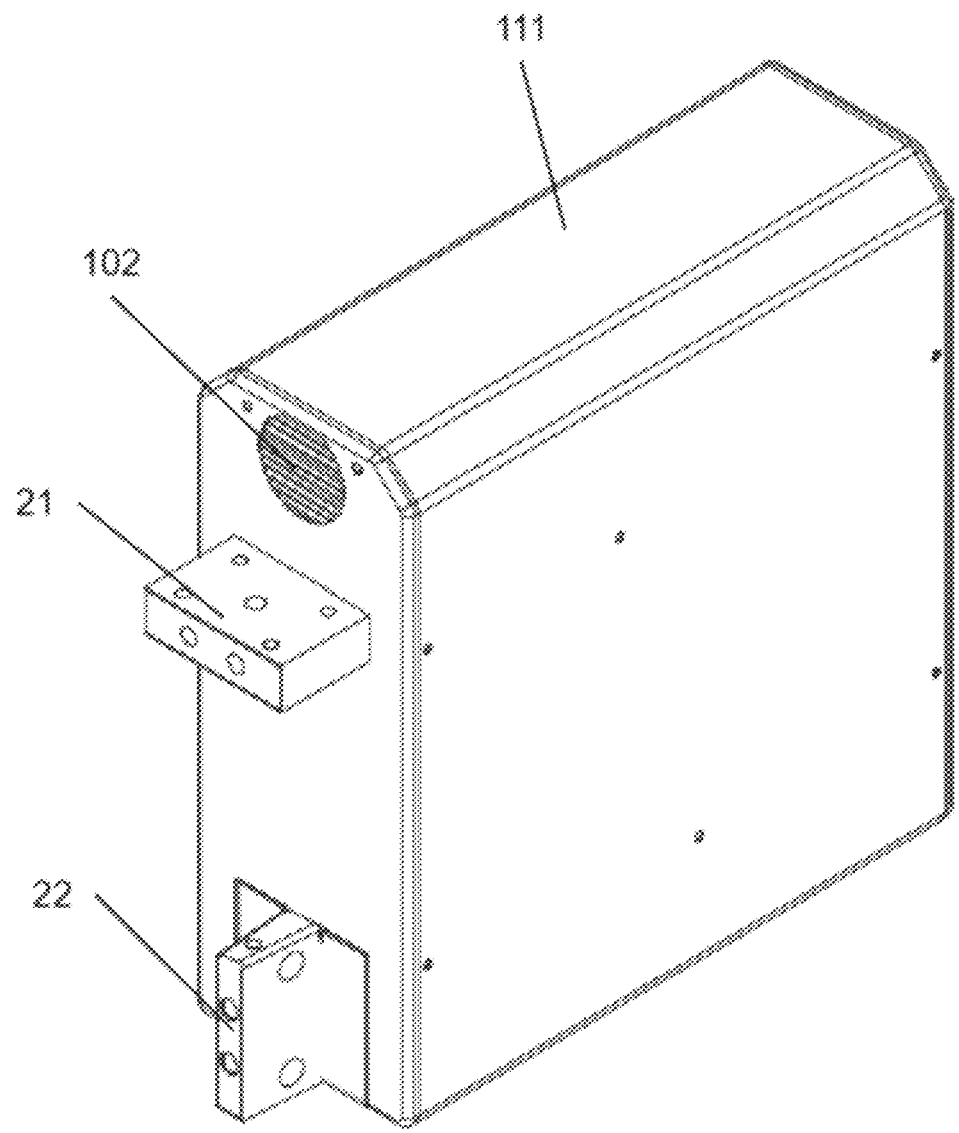
FIG. 4 is a structural diagram showing a casing of the low voltage high current power supply device proposed in the present invention.

As shown in FIG. 4, in the present embodiment, the power supply device further comprises a casing 111, wherein a plurality of air outlets 102 are provided in the casing 111, portions of the first heat dissipation panel 21 and the second heat dissipation panel 22 extend out of the casing 111, a plurality of through-holes for connecting with a welding tong are provided on the portions of the first heat dissipation panel 21 and the second heat dissipation panel 22 extending out of the casing 111, so it is convenient to assemble and detach the welding tong, in some embodiments, the first heat dissipation panel 21 and the second heat dissipation panel 22 can be used as electrodes, by connecting with flexible electrodes, the first heat dissipation panel 21 and the second heat dissipation panel 22 can be used as positive and negative electrodes of the welding power supply device.

As shown in FIGS. 1 and 3, in the present embodiment, a communication tube 201 is provided in between the first heat dissipation panel 21 and the second heat dissipation panel 22, an end of the communication tube 201 is connected with a plurality of cooling water passages in the first heat dissipation panel 21, another end thereof is connected with a plurality of cooling water passages in the second heat dissipation panel 22, so that cooling water circulation is realized, cooling effects are further improved and usage amount of cooling water can be reduced. In the present embodiment, by interaction of the plurality of central leading out terminals 40 and the plurality of secondary leading out terminals 50 heat generated by coils of the transformer 100 can be transmitted to the plurality of central leading out terminals 40 and the plurality of secondary leading out terminals 50, the plurality of central leading out terminals 40 are connected symmetrically on both sides of the first heat dissipation panel 21, by direct contact between the plurality of central leading out terminals 40 and the first heat dissipation panel 21, and the plurality of secondary leading out terminals 50 are connected symmetrically at both sides of the second heat dissipation panel 22, and by connecting the plurality of central leading out terminals and the plurality of secondary leading out terminals of ribbon shapes at different positions of the at least one secondary coil, heat dissipation effects of the transformer 100 is further improved, normal working of the transformer can be promised, that is, the output power of the transformer is maintained to be at the level of tens of thousands of amperes, the heat produced by the transformer is immediately cleared by the heat dissipation unit 20, and the transformer can always work in high current conditions.

As shown in FIGS. 1 and 3, in the present embodiment, the transformer 100 comprises a plurality of secondary leading out terminals 50, the plurality of secondary leading out terminals 50 are formed by ribbon-shaped structures led out from different positions of the at least one secondary coil and are connected with the heat dissipation unit 20, the plurality of secondary leading out terminals 50 extend to a direction far away from the plurality of central leading out terminals 40, the plurality of secondary leading out terminals 50 are arranged at the same plane after being bent for a plurality of times, the plurality of secondary leading out terminals 50 are configured to be copper ribbon structures, the plurality of secondary leading out terminals 50 are symmetrically provided at both sides of the secondary heat dissipation panel 22, and are connected with the secondary heat dissipation panel 22, in some embodiments, the first heat dissipation panel 21 and the second heat dissipation panel 22 can be used as electrodes, and by connecting with flexible electrodes the first heat dissipation panel 21 and the second heat dissipation panel 22 are used as positive and negative electrodes of the welding power supply device.

As shown in FIG. 3, in the present embodiment, the plurality of secondary leading out terminals 50 comprise a first secondary leading out terminal 51 and a second leading out terminal 52, the first leading out terminal 51 and the second leading out terminal 52 are connected at different positions of the at least one secondary coil, the heat generated by the at least one secondary coil can be transmitted to the first secondary leading out terminal 51 and the second secondary leading out terminal 52 by thermal conduction, and disseminated via the heat dissipation unit 20, in this way, heat dissipation effects of the transformer are improved. In the present embodiment, the second secondary leading out terminal 52 is located at a side of the first secondary leading out terminal 51, the second secondary leading out terminal 51 comprises a first portion and a second portion, the first portion is connected with the at least one secondary coil, and a gap is reserved with the first secondary leading out terminal 51, the second portion is connected with the first portion, and the second portion contacts the heat dissipation unit 20, the second portion is located at the same plane as the first secondary leading out terminal 52, so the rectifier diodes of the rectifier assembly can be connected in between the second heat dissipation panel and the plurality of secondary leading out terminals, in the meanwhile, heat dissipation areas at the secondary output ends are increased, heat dissipation effects of the transformer are enhanced, in some embodiments, when the first secondary leading out terminal 51 and the second secondary leading out terminal are not located at the same plane, rest the first secondary leading out terminal 51 and the second secondary leading out terminal 52 closely on the heat dissipation unit 20.

As shown in FIGS. 1 and 3, in the present embodiment, the transformer 100 comprises further at least one cooling water duct 60, the at least one cooling water duct 60 is wound at an outer side of the transformer line pack formed by providing thermal conduction insulation paste in between the primary coil and the at least one secondary coil, so that heat generated by the primary coil and the at least one secondary coil can be cooled down, heat dissipation effects of the transformer 100 is further improved, it shall be noted that, in some embodiments, without winding the at least one cooling water duct around the transformer the same effect can also be achieved. In the present embodiment, the at least one cooling water duct 60 comprises one or more cooling water ducts, in the present embodiment, the at least one cooling water duct 60 comprises a first cooling water duct 61 and a second cooling water duct 62, the first cooling water duct 61 and the second cooling water duct 62 are wound around the primary coil and the at least one secondary coil coaxially so to cool down the primary coil and the at least one secondary coil. The at least one cooling water duct can be annular water bags, sleeved over the transformer line pack, and forms water circulation together with the water pipe joint 601. In the present embodiment, either ends of the first cooling water duct 61 and the second cooling water duct 62 are wound around the primary coil and the at least one secondary coil, and pass the plurality of central leading out terminals 40, another ends thereof are connected with the water pipe joint 601.

As shown in FIGS. 1 and 3, in the present embodiment, the at least one cooling water duct 60 further comprises an intermediate cooling water duct 63, an end of the intermediate cooling water duct 63 is connected with the water pipe joint 601, another end thereof is connected with the heat dissipation unit 20, in the present embodiment, an end of the intermediate cooling water duct 63 is connected with the water shunt joint 601 and another end thereof is connected with the at least one cooling water passage in the second heat dissipation panel 22, so that the at least one cooling water duct 60 communicates with the cooling water in the first heat dissipation panel 21 and the second heat dissipation panel 22, circulation of the cooling water is achieved so as to further improve heat dissipation effects of the transformer 100 and reduce the flow of the cooling water. By configuration of the plurality of cooling water ducts 60 and the water pipe joint, a plurality of transformer bodies can be connected together, cooling systems of the plurality of transformer bodies can communicate with each other, heat transmitted outside the transformer can be sent out via the at least one cooling water duct, heat dissipation effects of the transformer are improved to a further extent, heat dissipation of the transformer is done, power consumption due to heat is reduced and high current output power of the transformer is greatly improved.

Figure 5:
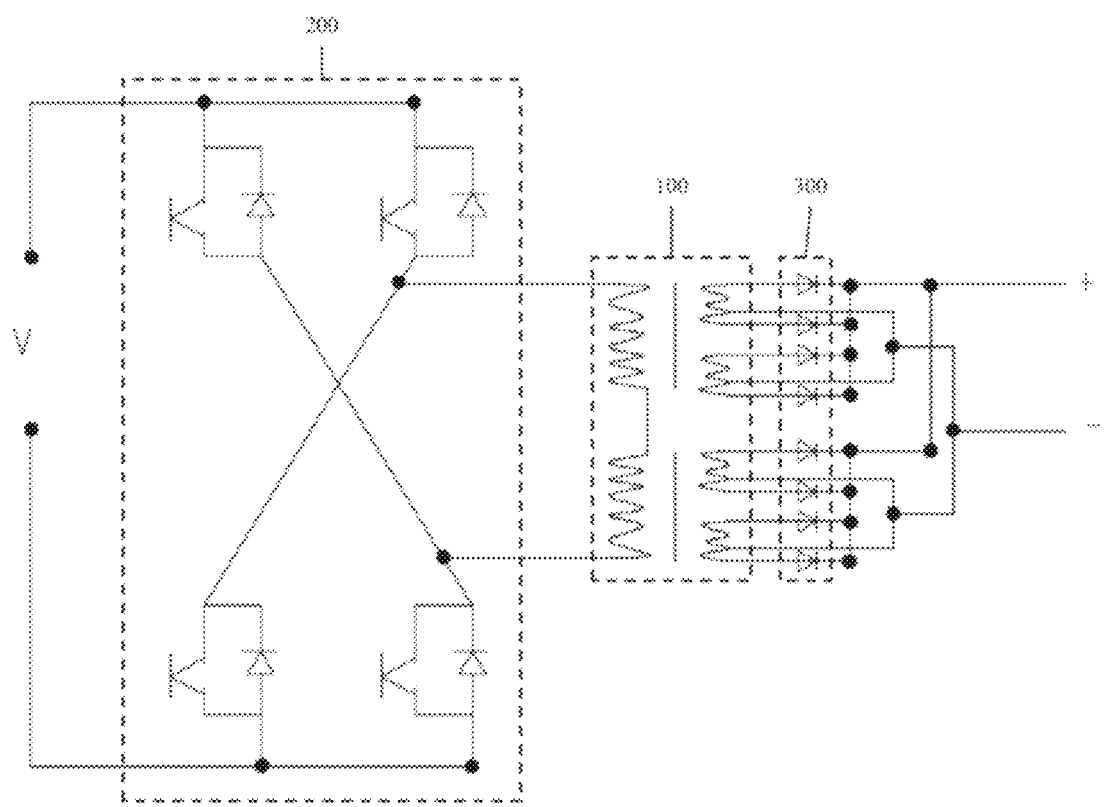
FIG. 5 is a circuit diagram showing the low voltage high current power supply device proposed in the present invention.

As shown in FIG. 5, in the present embodiment, circuit connection methods of the welding power supply device are as following, an insulation layer is provided in between the first heat dissipation panel 21, the second heat dissipation panel 22 and the transformer body 10, that is, the insulation layer is provided in between the first heat dissipation panel 21, the second heat dissipation panel 22 and the magnetic core 11, the inverter assembly 200 is provided above the first heat dissipation panel 21, and is insulated, the inverter assembly 200 is connected with the primary coil via at least one primary pin, the rectifier assembly 300 is provided in between the plurality of secondary leading out terminals and the second heat dissipation panel 22, the plurality of central leading out terminals are connected with the first heat dissipation panel 21, the plurality of secondary leading out terminals and the plurality of primary leading out terminals are led out from different positions of the at least one primary coil, that is, input voltage passes the inverter assembly 200, the at least one primary pin 30 to the primary coil, passes the transformer and is output via the at least one secondary coil, and is input into the first heat dissipation panel 21 via the plurality of central leading out terminal 300, and in this way, the second heat dissipation panel 22 serves as a negative electrode of the welding power supply.

As shown in FIG. 4, in the present embodiment, the welding power supply device comprises further a casing 111, wherein portions of the first heat dissipation panel 21 and the second heat dissipation panel 22 extend out of the casing 111, a plurality of through-holes for connecting with the welding tongs are provided in the portions of the first heat dissipation panel 21 and the second heat dissipation panel 22 extending out of the casing 111, so that it is convenient to install and detach the welding tongs. In some embodiments, the first heat dissipation panel 21 and the second heat dissipation panel 22 can be used as electrodes, by connecting foreign flexible electrodes, the first heat dissipation panel 21 and the second heat dissipation panel 22 can be used as positive and negative electrodes of the welding power supply device.

In some specific embodiments, the power supply device is used in electrical resistance welding, comprising C-shaped spot welding machines and X-shaped spot welding machines, and the first heat dissipation panel 21 in the welding power supply device serves as a second electrode 112 and the second heat dissipation panel 22 serves as a first electrode.

Figure 6:
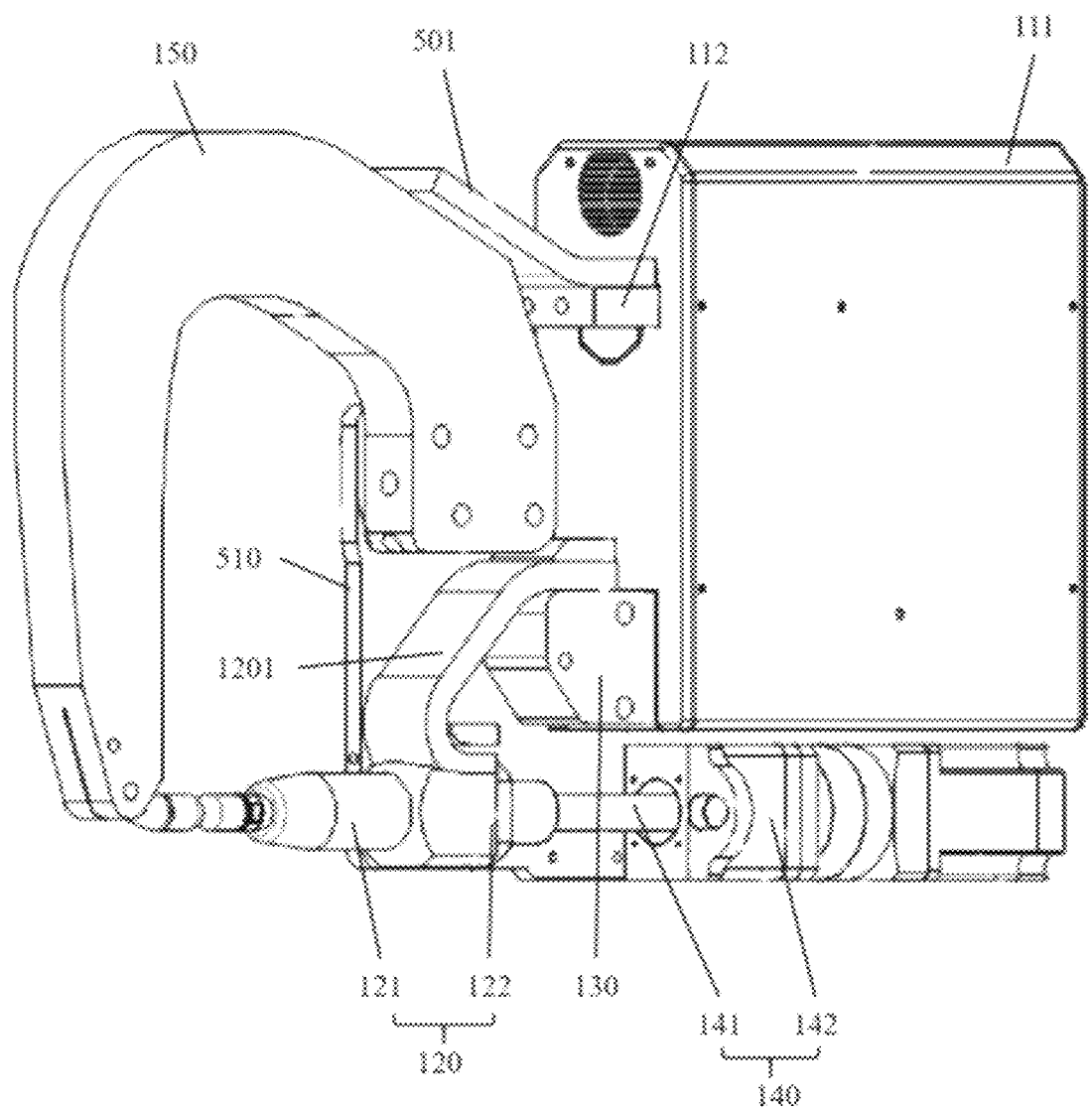
FIG. 6 is a structural diagram showing a C-shaped welding tong in the low voltage high current power supply device proposed in the present invention.

As shown in FIG. 6, in the present embodiment, the power supply device is used in C-shaped spot welding machines, wherein the power supply device comprises the casing 111, the first electrode and the second electrode 112, portions of the first electrode and the second electrode 112 extend out of the casing 111, and the extending portions are located at the same side of the casing 111, and the first electrode is provided vertically and close to a bottom portion of the casing 111, and the second electrode 112 is provided horizontally and close to a top portion of the casing 111, a plurality of connection holes for connecting with the movable arm structure 120 and the static arm 150 are provided on the portions of the first electrode and the second electrode 112 extending out of the casing 111, so that connection between the welding tongs and the power supply device is simple and it is easy to detach any of them.

As shown in FIG. 6, the welding power supply device is used in C-shaped spot welding machines, comprising a movable arm structure 120, a static arm 150, a drive assembly 140, at least one lateral connection plate 510 and at least one connection block 130 provided in between the at least one lateral connection plate 510, the movable arm structure 120 comprises a movable arm 121 and a nut flange 122, an end of the movable arm 121 is connected with the nut flange 122, and the nut flange 122 is connected with the at least one connection block 130 via a first conductive bridge 1201; a drive rod 141 of the drive assembly 140 for driving the movable arm is connected with the nut flange 122, and the drive rod 141 is located at a bottom portion of the casing 111, and a flange structure 142 is provided on the drive rod 141; the static arm 150 is connected with the second electrode 112 via a second conductive bridge 501, the static arm 150 is connected with the movable arm 121 via a plurality of lateral connection plates 510, the plurality of lateral connection plates 510 are connected with the static arm 150 and the at least one connection block 130 via a plurality of screws, the plurality of lateral connection plates 510 are rotatably connected on the flange structure 142, by connecting the plurality of lateral connection plates 510, the movable arm structure, the at least one connection block 130, the drive assembly 140 and the static arm 150 are integrally connected to be a spot welding connection mechanism, and to ease illustration, in the present embodiment, only a lateral connection plate is shown, another lateral connection plate that is parallel with the present one is not shown. In the present embodiment, the static arm 150 is C-shaped, the at least one connection block 130 is configured to be a U-shaped connection block, connection holes for connecting with the power supply device are provided in the at least one connection block 130, the power supply device is configured to be in front of the drive assembly 140, the first electrode of the power supply device is plugged into the U-shaped connection block and fixed with bolts, and when it is necessary to detach them, by turning the bolts the power supply device can be removed, and quick swift of the welding power supply of the welding tongs can be realized.

Figure 7:
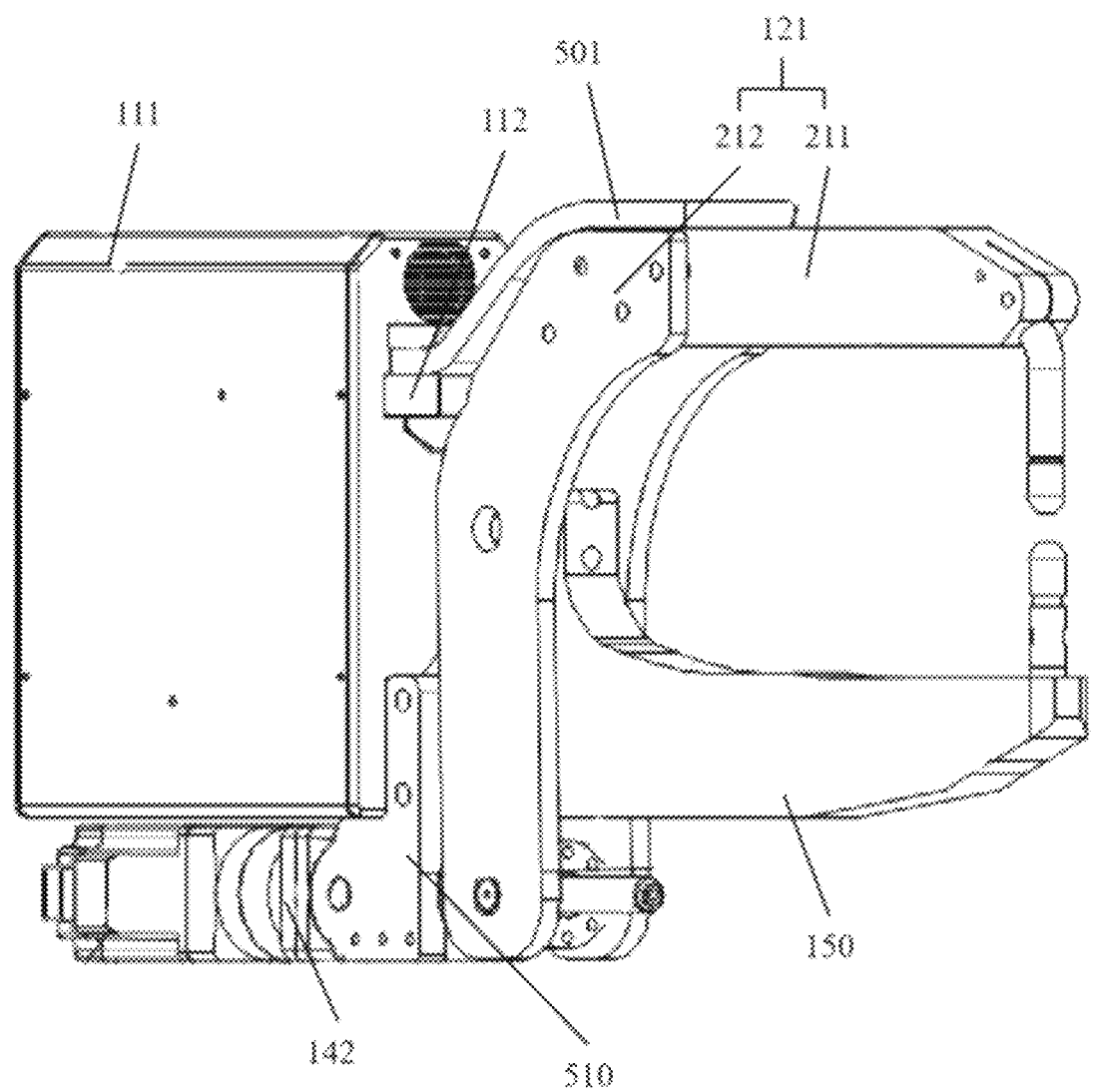
FIG. 7 is a structural diagram showing an X-shaped welding tong in the low voltage high current power supply device proposed in the present invention.

As shown in FIG. 7, in the present embodiment, the welding power supply device is used in X-shaped spot welding machines, and in X-shaped welding tongs, the movable arm 121 comprises a transverse rod portion 211 parallel to the static arm 150 and a pair of rotation plates 212 rotatably connected with both sides of the transverse rod portion 211, the at least one connection block 130 is provided in an end of the static arm 150 close to the lateral connection plate 510, the at least one connection block 130 is integrally formed with the end of the static arm 150, the drive assembly 140 drives the drive rod 141 to drive the nut flange 122 to move the pair of rotation plates 212, so that the electrode stems are driven to conduct reciprocal movement in a vertical direction, and welding pressure is generated in between the electrode cap on the electrode stem of the static arm and the electrode cap on the electrode stem of the movable arm.

The first electrode of the power supply device is plugged into a U-shaped groove of the at least one connection block, by screws, the at least one connection block 130 is connected with the corresponding connection holes provided in the first electrode of the power supply device, the welding power supply device and the welding tongs are made integral, and rapid detachment of the welding power supply and the welding tongs becomes convenient.

In the present invention, a low voltage high current power supply device is provided, the primary coil and the at least one secondary coil are configured to be copper ribbon-shaped structures and are closely wound around the magnetic core, in the meanwhile, thermal conductive insulation paste is filled to form a transformer line pack with a thermal conduction body, cooling is done by winding cooling ducts around the transformer line pack, and the first heat dissipation panel and the second heat dissipation panel respectively connected symmetrically with the top portion and the bottom portion of the transformer body are provided at the plurality of central leading out terminals and the plurality of secondary leading out terminals connected at different positions of the at least one secondary coil, in this way, the leakage inductance of the transformer is small, heat dissipation is quick, especially in low voltage high current high frequency conditions, duty-ratio-loss is small, a ratio of active power is big, working frequency is greatly improved and switch stress is greatly reduced for rectifiers and inverters.

In the present invention, the inverter assembly and the rectifier assembly are provided tightly on both sides of the transformer, the inverter assembly rests tightly on the first heat dissipation panel, the rectifier assembly is provided symmetrically at both sides of the second heat dissipation panel, with the heat dissipation panels provided at both sides of the transformer, heat generated by the inverter assembly and the rectifier assembly are cleared, by the heat dissipation unit, the inverter assembly, the rectifier assembly and the transformer body are closely assembled together, so the power supply device is of a small volume, heat dissipation is done quickly, and in low voltage high current high frequency conditions, the plurality of transformer bodies are connected and the level of high current output power of the transformer is significantly improved.

For the low voltage high current power supply device provided in the present invention, by providing at least one mounting hole for connecting with at least one connection block of the electric resistance welding tong at an end of the second heat dissipation panel, free interchange between X-shaped and C-shaped electric resistance welding tongs can be realized, which makes the fabrication and maintenance work extremely convenient, and expenses and resources are saved.

In the present invention the low voltage high current power supply device is provided, by arranging a plurality of secondary coils and the special heat dissipation configurations, the transformer can work for a long term under current of tens of thousands of amperes, as the leakage inductance of the transformer is very small, switch stress is significantly reduced, appliances of smaller volumes can be selected as the inverter tubes and the rectifier tubes, therefore, low requirements are placed on cooling, the inverter assembly and the rectifier assembly are integrated together, and integral design of the power supply device to be very tight is made possible. As the leakage inductance of the transformer is small, duty-ratio-loss is small, a ratio of active power is big, the low voltage high current power supply device can maintain output of very high efficiency at a working frequency of 10 KHz-20 KHz.

The foregoing is only a description of some preferred embodiments and the technical principles behind the embodiments, those skilled in the art shall appreciate that, the scope of the present invention is not limited to the technical solution formed by the specific combination of the foregoing technical features, and shall also cover other technical solutions formed by random combination of the foregoing technical features and equivalents thereof, for example, the technical solutions formed by replacing the foregoing features with technical features of similar functions as disclosed (but not limited to) in the present invention.

Except the technical features mentioned in the specification, the other technical features are known to those skilled in the art and to outline the novelty and inventiveness of the present invention, the other technical features are not given repeatedly here.

The invention claimed is:

1. A low voltage high current power supply device, comprising:
    a transformer body, wherein the transformer body comprises a magnetic core, a primary coil and at least one secondary coil, the primary coil and the at least one secondary coil are wound around the magnetic core, and a thermal conductive insulation paste is filled in between the primary coil and the at least one secondary coil to form a transformer line pack;
    a plurality of central leading out terminals and a plurality of secondary leading out terminals are disposed at different positions of the at least one secondary coil, wherein the plurality of central leading out terminals are symmetrically provided at both sides of the magnetic core and the plurality of secondary leading out terminals are symmetrically provided at both sides of the magnetic core;
    a heat dissipation unit, comprising a first heat dissipation panel and a second heat dissipation panel, wherein the first heat dissipation panel is horizontally provided at a top portion of the transformer body, the second heat dissipation panel is vertically provided at a bottom portion of the transformer body, the plurality of central leading out terminals are symmetrically provided at both sides of the first heat dissipation panel and the plurality of secondary leading out terminals are symmetrically connected at both sides of the second heat dissipation panel;
    an inverter assembly, wherein the inverter assembly is provided on the first heat dissipation panel, is located at a side opposite to the transformer body and is connected with the primary coil via at least one primary pin;
    a rectifier assembly, wherein the rectifier assembly is provided symmetrically at both sides of the second heat dissipation panel and is located in between the plurality of secondary leading out terminals and the second heat dissipation panel.

2. The low voltage high current power supply device according to claim 1, wherein the at least one primary pin, the plurality of central leading out terminals and the plurality of secondary leading out terminals are configured to be of a copper strip structure.

3. The low voltage high current power supply device according to claim 1, wherein an insulation layer is provided in between the first heat dissipation panel, the second heat dissipation panel and the magnetic core of the transformer body.

4. The low voltage high current power supply device according to claim 1, wherein the at least one secondary coil and the primary coil are configured to be stripe-shaped copper conductors, and a thickness of the copper conductors falls into a range of 0.05 mm to 1 mm.

5. The low voltage high current power supply device according to claim 1, wherein the plurality of secondary leading out terminals are arranged sequentially on a plane after being bent.

6. The low voltage high current power supply device according to claim 1, wherein a plurality of cooling water passages are provided inside the first heat dissipation panel and the second heat dissipation panel.

7. The low voltage high current power supply device according to claim 1, wherein a circle of cooling water ducts is wound outside the primary coil and the at least one secondary coil.

8. The low voltage high current power supply device according to claim 7, wherein the cooling water ducts comprise one or more cooling water pipes, wherein ends of the one or more cooling water pipes are connected via at least one water pipe joint.

9. The low voltage high current power supply device according to claim 1, wherein the power supply device further comprises a casing, and either ends of the first heat dissipation panel and the second heat dissipation panel extend out of the casing.

10. The low voltage high current power supply device according to claim 9, wherein a plurality of connection holes for connection with a welding tong are provided on portions of the first heat dissipation panel and the second heat dissipation panel extending out of the casing.

* * * * *